(12) United States Patent
Jensen et al.

(10) Patent No.: US 6,755,293 B2
(45) Date of Patent: Jun. 29, 2004

(54) RPM-RESPONSIVE SPRAG OVERRUNNING CLUTCH

(76) Inventors: Lamar Nathan Jensen, 11146 Tall Pines Way, Sandy, UT (US) 84092; Charles Liu, 4620 Wasatch Blvd., Salt Lake City, UT (US) 84124

( * ) Notice: Subject to any disclaimer, the term of this patent is extended or adjusted under 35 U.S.C. 154(b) by 0 days.

(21) Appl. No.: 10/114,741

(22) Filed: Apr. 2, 2002

(65) Prior Publication Data

US 2003/0183473 A1 Oct. 2, 2003

(51) Int. Cl.[7] .......................... F16D 41/07; F16D 43/04
(52) U.S. Cl. ..................... 192/45.1; 74/333; 192/48.92; 192/105 CE
(58) Field of Search ............... 192/45.1, 20, 35, 192/47, 41 A, 48.92, 105 A, 105 R, 105 BA, 103 B, 3.51, 105 CE; 74/333

(56) References Cited

U.S. PATENT DOCUMENTS

| | | | | |
|---|---|---|---|---|
| 2,385,799 A | * | 10/1945 | Dodge | 192/45.1 |
| 2,916,124 A | * | 12/1959 | Troendly et al. | 192/45.1 |
| 2,923,388 A | * | 2/1960 | Nielsen | 192/45.1 |
| 3,547,239 A | * | 12/1970 | Titt | 192/45.1 |
| 3,753,477 A | * | 8/1973 | Cadet | 192/41 A |
| 4,185,723 A | * | 1/1980 | Kelbel | 192/48.92 |
| 5,297,450 A | * | 3/1994 | MacPherson | 74/333 |
| 5,383,542 A | * | 1/1995 | Stockton | 192/45.1 |
| 5,419,419 A | * | 5/1995 | Macpherson | 74/333 |

FOREIGN PATENT DOCUMENTS

WO    WO 93/14328 A1 * 7/1993

* cited by examiner

*Primary Examiner*—Rodney H. Bonck
(74) *Attorney, Agent, or Firm*—TraskBritt

(57) ABSTRACT

An RPM-responsive automatic sprag overrunning clutch includes a hub adapted to be attached to a drive shaft, a ring gear surrounding the hub and spaced therefrom, and a plurality of sprags positioned between the hub and the ring gear. An actuator mechanism secured to the hub includes a pair of movable segments and a pair of rollers which are free to move radially of the hub under the influence of centrifugal force as the clutch is increasingly rotated. All the movable segments are connected to an annular plate which is pinned to each of the sprags such that circumferential movement of the movable segments is transmitted to the sprags to shift them into or out of wedging relationship between the hub and the ring gear.

10 Claims, 4 Drawing Sheets

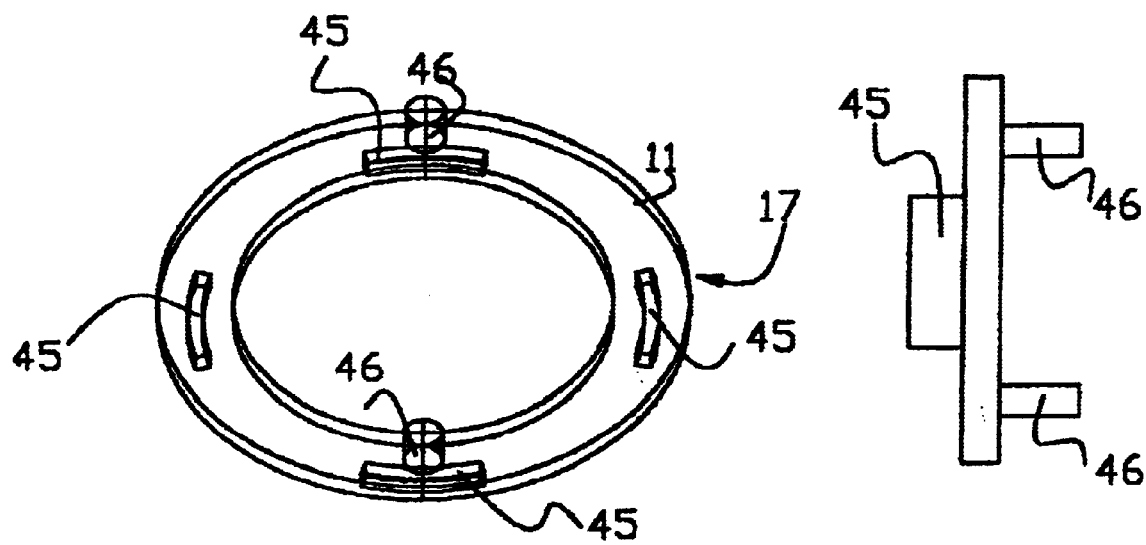
FIG.6a  FIG.6b
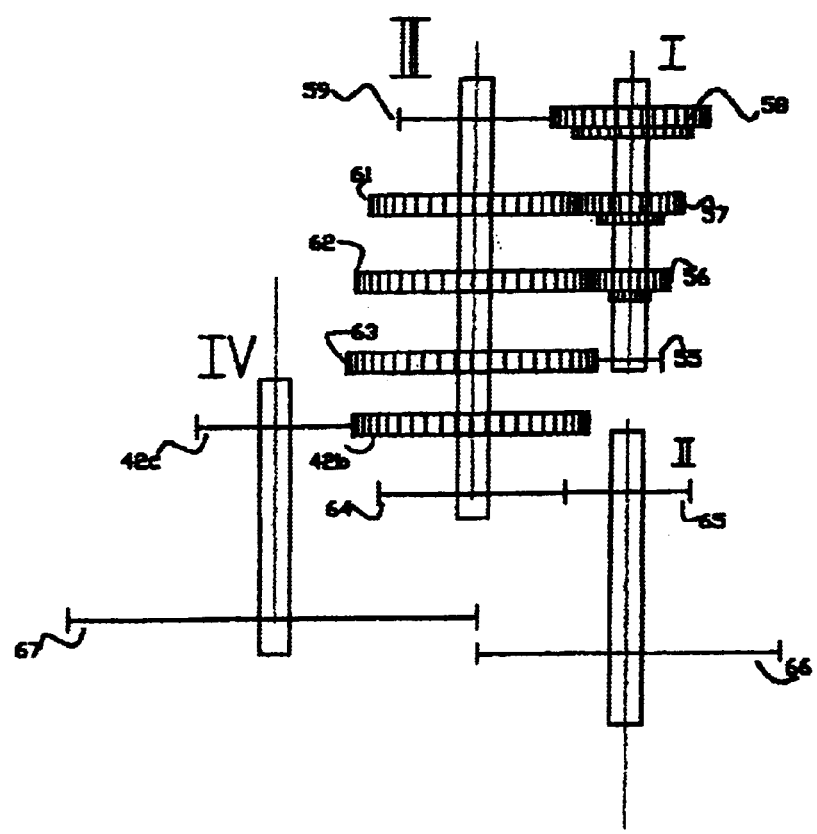
FIG. 7

US 6,755,293 B2

RPM-RESPONSIVE SPRAG OVERRUNNING CLUTCH

The present invention relates to a sprag overrunning clutch and, more particularly, to an overrunning clutch which is automatically engaged or disengaged in response to the rotational speed at which it is driven.

BACKGROUND

Continuously variable transmissions (CVT) which have been proposed for use in the driveline of an automotive vehicle have typically involved the use of two variable V-belt pulleys joined by a flexible V-belt, each pulley having an adjusting device to vary the width of the pulley and thereby adjust the transmission ration, as shown in U.S. Pat. Nos. 4,630,504—Smirl and 6,050,911—Feuchter et al. Such transmissions have been effective, but are relatively inefficient and are complex and expensive to manufacture and maintain.

Alternative constructions for CVT transmissions utilizing overrunning clutches have been proposed to take advantage of the inherent high efficiency of such clutches as well as their simplified mechanical construction, thereby avoiding many of the disadvantages of the V-belt pulley transmissions.

U.S. Pat. No. 4,817,451—Weismann teaches a transmission employing roller clutches which includes an outer race spaced from an inner race, the inner race having cam surfaces which are inclined relative to the outer race. Rollers are set in a cage which generally rotates with the cam surfaces, such that slight rotation of the cage relative to the cam surfaces will result in selected engagement or disengagement of the inner and outer races through wedging or release of the rollers.

U.S. Pat. No. 5,145,042—MacPherson discloses a two-way roller clutch for use in a variable speed transmission which includes a cam disk having a plurality of elongated recesses formed in its peripheral surface and a roller retainer circumferentially supporting a plurality of spring-loaded rollers within respective recesses in the cam disk.

U.S. Pat. No. 5,263,906—Antonov shows an automatic transmission which includes a multiple disk type clutch which is controlled by pivotally mounted weights acting under the influence of centrifugal force.

U.S. Pat. No. 5,267,912—Casanova is drawn to a mechanical centrifugal clutch in which a drive shaft is connected to a planetary support which carries a plurality of weighted planetary gears meshed with a sun gear which is connected to a driven output shaft.

SUMMARY OF THE INVENTION

The present invention avoids the shortcomings of the prior known overrunning clutches by provision of a sprag-type overrunning clutch which is automatically engaged or disengaged smoothly in response to the rotational speed at which it is driven, rather than depending upon external activation.

DRAWINGS

The best mode presently contemplated for carrying out the present invention will be understood from the detailed description of the preferred embodiments illustrated in the accompanying drawings in which:

FIG. 6a is a perspective view of a connecting ring which connects the clutch of the present invention to the actuating mechanism of FIG. 4;

FIG. 6b is a side view of the connecting ring of FIG. 6a;

FIG. 7 is a diagrammatic view of a continuously variable transmission utilizing the sprag overrunning clutch of the present invention.

DETAILED DESCRIPTION OF THE PRESENT INVENTION

Figure 1:
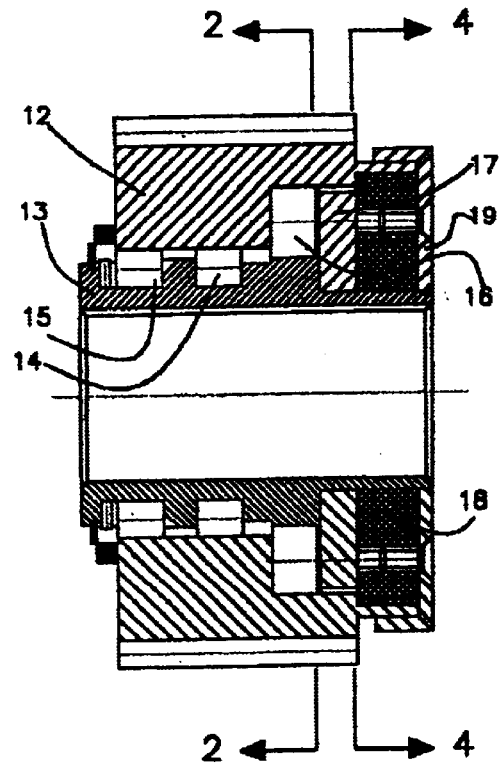
FIG. 1 is an elevation view in cross-section of a sprag overrunning clutch and actuating mechanism according to the present invention.

Referring more particularly to FIG. 1 of the drawing, the RPM-responsive sprag overrunning clutch 11 of the present invention is shown mounted between a driven member 12 and a drive member 13. The driven member 12 is mounted for rotation about the drive member 13 by means of bearings 14, 15. The drive member 13 is adapted to be splined, or similarly connected, to a drive shaft (not shown) while the outer periphery of the driven member 12 is formed with gear teeth for engagement with a gear or gears (not shown). The clutch 11 includes a sprag assembly 16, a connecting ring 17 and an actuating mechanism 18, all of which are held in place by an annular sealing cap 19 affixed to the drive member 13.

Figure 3:
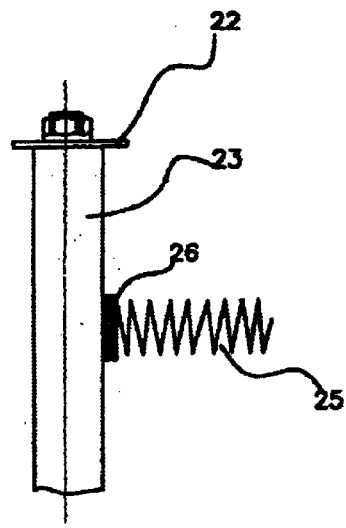
FIG. 3 is an elevation view at an enlarged scale of an attachment pin employed in FIG. 2.
Figure 2:
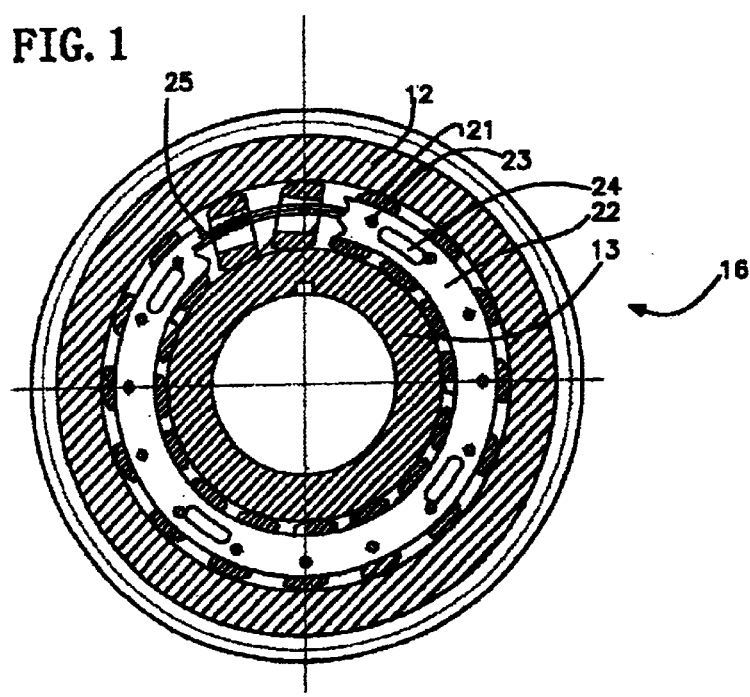
FIG. 2 is a side view, partly in section, of the sprag assembly of the present invention taken along line 2—2 of FIG. 1.

As illustrated in FIG. 2, the sprag assembly 16 includes a series of wedging elements or sprags 21, each of which is attached to a thin, annular plate 22 by means of a pin 23. The sprags 21 are elongated elements with rectangular cross-section and having rounded corners and a central opening extending from side to side. The annular plate 22 is provided with a plurality of openings, one for each sprag, and a series of elongated slots 24 distributed evenly about its lateral surfaces. A hole (not shown) is drilled transversely of each sprag and, as shown in FIG. 3, a pin 23 having an enlarged flat head is passed through an opening in the plate 22 and received within the transverse hole in the sprag. A compression spring 25 is positioned between a clip 26 on the pin 23 and a surface of the central opening through the sprag to bias the sprag to its neutral position where it is not wedged between the driven member 12 and the drive member 13.

Figure 5:
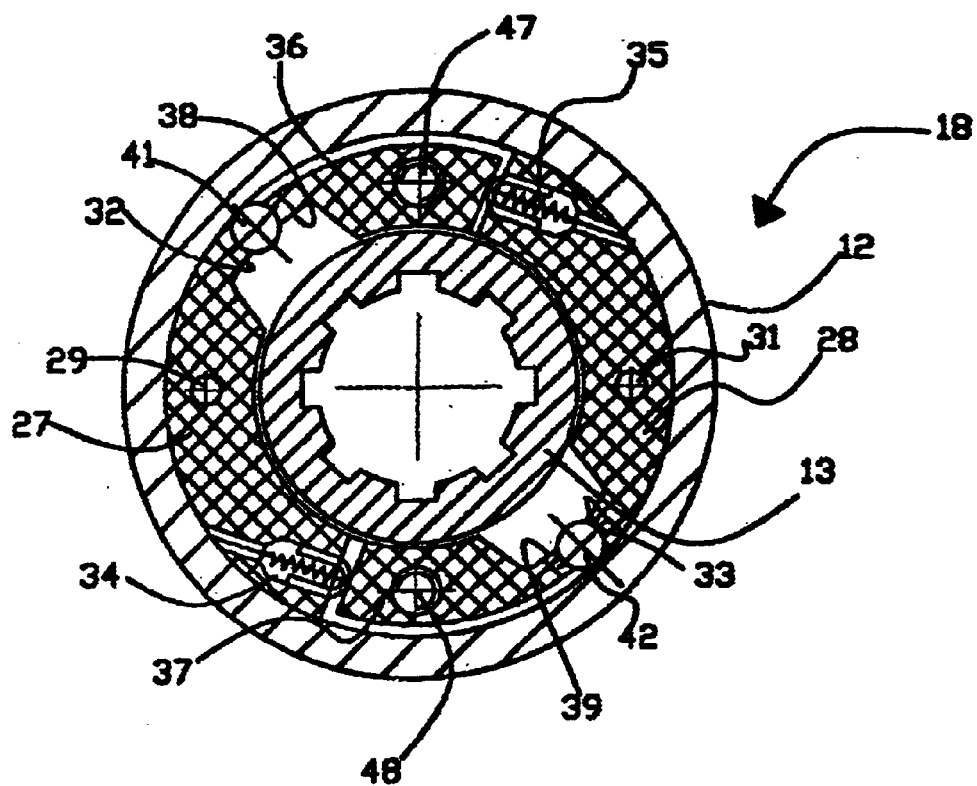
FIG. 5 is a cross-section similar to FIG. 4 with the clutch engaged.
Figure 4:
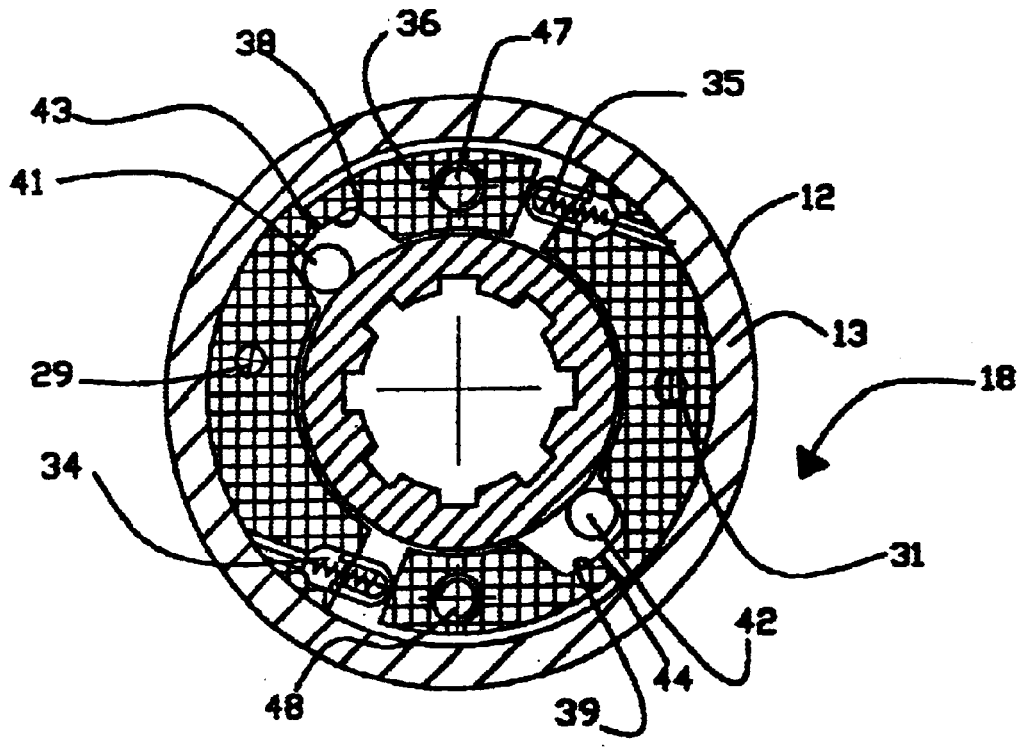
FIG. 4 is a side view of the clutch actuating mechanism of the present invention taken along line 4—4 of FIG. 1 with the clutch disengaged.

As shown in FIGS. 4 and 5, the actuating mechanism 18 for the present overrunning clutch 11 is positioned in the annulus between the driven member 12 and the drive member 13 and includes two similar arcuate segments 27 and 28 which are fixed in position adjacent the sealing cap 19 by cap screws 29, 31. The fixed segments 27 and 28 each have one end which is reduced in thickness to form a projection 32, 33 adjacent its outer periphery and a spring-loaded plunger 34, 35 mounted in the opposite end. Two similar movable segments 36 and 37 are positioned between the fixed segments, each movable segment 36, 37 being provided with a laterally-extending opening 47, 48 and having one end reduced in thickness to form a projection 38, 39 adjacent its outer periphery. A cylindrical roller or weight 41, 42 is positioned in each of the areas of reduced thickness at the adjacent ends of the fixed and movable segments. The inner corners of the abutting projections 32, 38 and 33, 39 are relieved to form a relatively wide groove 43, 44, respectively.

The connecting ring 17, as illustrated in FIGS. 6a and 6b, is a relatively thick, flat ring which has a series of elongated lugs 45 protruding from one flat surface and a pair of cylindrical knobs 46 protruding from the opposite surface. The dimensions, number and spacing of the lugs correspond with the dimensions, number and spacing of the elongated slots 24 on the annular plate 22, such that when the ring 17 is positioned against the plate 22, each of the lugs 45 will be received within one of the slots 24. The knobs 46 are located on a common diameter of the ring 17 and are dimensioned to be received within openings 47, 48 in movable segments 36 and 37, respectively.

Referring to FIG. 7 of the drawings, a continuously variable transmission (CVT) utilizing the present sprag overrunning clutch includes an input shaft I, an output shaft II, an intermediate shaft III, and a reverse shaft IV. The input shaft I carries a gear 55 and a plurality of the present RPM-responsive sprag overrunning clutches 56, 57 and 58, each of which is designed and constructed for engagement or disengagement at a preselected RPM as the rotational speed of the input shaft I is accelerated or decelerated. Gears 59 and 64 and a series of conventional overrunning clutches 61, 62 and 63 are fixed to the intermediate shaft III with gear 59 meshed with RPM-responsive clutch 58; conventional overrunning clutch 61 meshed with RPM-responsive clutch 57; conventional overrunning clutch 62 meshed with RPM-responsive clutch 56; conventional overrunning clutch 63 meshed with gear 55; and gear 64 meshed with gear 65. A gear 67 on the reverse shaft IV is adapted to mesh with a gear 66 on the output shaft II when the transmission is in reverse. FIG. 7 is illustrative of a transmission but does not include all of the elements of CVT, such as a clutch to connect the input shaft I to the motor, and anti-slippage gear, etc.

Figure 8:
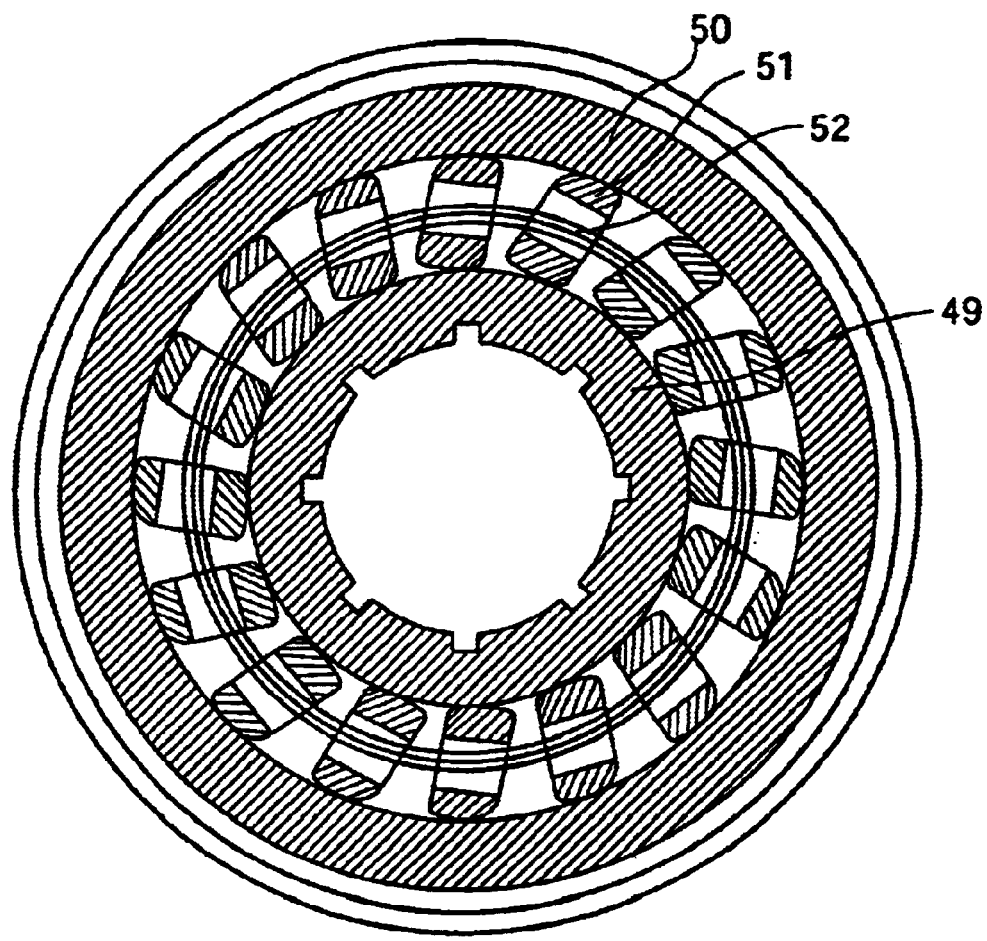
FIG. 8 is a side view in cross-section of a conventional sprag overrunning clutch with the sprags spring-biased to their wedging or engaged position.

FIG. 8 shows a conventional sprag-type overrunning clutch which includes a drive member or hub 49 which is adapted to be splined or otherwise secured to a drive shaft (not shown). An annular driven member or ring gear 50 is telescoped over the drive member 49 and spaced therefrom. A series of sprags 51 are positioned between the drive member 49 and driven member 50 and biased to their wedging or engaged position between the drive and driven members by means of springs 52.

OPERATION OF THE INVENTION

In the operation of the present RPM-responsive overrunning clutch, a motor-driven shaft is connected to the the drive member 13 such that the drive member rotates continuously with the shaft. Since the actuating mechanism 18 is connected to the drive member 13 by means of sealing cap 19 and cap screws 29, 31, it will rotate at the same RPM as the drive member. As the actuating mechanism 18 rotates, the rollers 41, 42 are thrown outwardly from the drive member 13 by centrifugal force and come to rest at the intersections of projections 32, 38 and 33, 39, respectively. As the rollers are pressed against the projections by centrifugal force, the movable segments 36, 37 are shifted circumferentially against the action of the spring-loaded plungers 34, 35 and the rollers come to rest between the respective projections. The mass of each of the rollers 41, 42 is calculated such that when it is combined with the centrifugal force generated at a predetermined RPM of the drive member, it will shift the movable member against the action of the spring-loaded plunger. Since the knobs 46 on the connecting ring 17 are received within the openings 47, 48 in the movable segments, the circumferential movement of the movable segments causes the connecting ring 17 to rotate in the same direction. This rotational movement of the connecting ring 17 is transferred to the annular plate 22 through lugs 45 on the connecting ring 17 being received within the slots 24 in the annular plate 22. Since the annular plate 22 is pinned to each of the sprags 21, rotational movement of the annular plate 22 engages the clutch by moving each of the sprags into wedging relationship between the drive member 13 and the driven member 12, causing the driven member 12 to rotate with the drive member 13. Thus, the present RPM-responsive overrunning clutch is engaged by centrifugal force acting on the rollers 41, 42 through movement of the movable segments 36, 37, connecting ring 17 and annular plate 22 to move the sprags 21 into wedging engagement between the driven member 12 and the drive member 13. When the motor is turned off or the drive shaft is decelerated, the centrifugal force is reduced to the point that the rollers 41, 42 drop out of contact with the projections, thus allowing the movable segments to be moved circumferentially by the spring-loaded plungers 34, 35 and rotate connecting ring 17 and annular plate 22 and move the sprags out of wedging engagement between the drive member 13 and the driven member 12, thereby disengaging the overrunning clutch.

With regard to the transmission of FIG. 7, when the gear shift lever is in the forward position, the initial drive from the input shaft I to the output shaft II is through gear 55, conventional overrunning clutch 63 and gears 64 and 65. When the RPM of the input shaft I reaches the designed RPM of the present overrunning clutch 56, it will become engaged and begin to drive the intermediate shaft at an accelerated rate whereat the conventional overrunning clutch 63 becomes overrunning and no longer provides any drive to gear 55. At this time, the drive of the intermediate shaft III is through RPM-responsive clutch 56 and conventional overrunning clutch 62. As the RPM of the input shaft I increases and reaches the design RPM of the RPM-responsive clutch 57, it becomes engaged and begins to drive the intermediate shaft III at an increasing rate until conventional overrunning clutch 62 becomes overrunning. As the input shaft I continues to accelerate, RPM-responsive clutch 58 is engaged and conventional overrunning clutch 61 becomes overrunning so the intermediate shaft III is driven through RPM-responsive clutch 58 and gear 59. Three stages of the transmission are shown, but it should be understood that any number of stages may be employed depending upon the application.

When the motor connected to the input shaft I of the transmission of FIG. 7 is braked or decelerated and the rate at which the input shaft is driven falls below the design point of RPM-responsive clutch 58, it is disengaged and the drive for intermediate shaft III is through RPM-responsive clutch 57 and conventional overrunning clutch 61. As the motor continues to decelerate, RPM-responsive clutches 57 and 56 are disengaged in succession, until the drive of the output shaft II is through gear 55, conventional overrunning clutch 63 and gears 64 and 65.

While the invention has been described with reference to specifically illustrated embodiments, it should be understood that various changes may be made without departing from the disclosed inventive subject matter particularly pointed out and claimed here below.

What is claimed is:

1. An RPM-responsive sprag overrunning clutch, which includes:

a generally cylindrical drive member adapted to be secured to a drive shaft;

an annular driven member telescoped over the drive member and spaced therefrom;

an annular plate;

a plurality of sprags pinned to the annular plate and positioned between the drive member and the driven member; each of the plurality of sprags being configured to be shifted into or out of wedging engagement between the drive member and the driven member;

an RPM-responsive actuating mechanism operatively connected to the plurality of sprags for shifting the plurality of sprags into or out of wedging engagement between the drive member and the driven member, the actuating mechanism including:

a plurality of weights positioned on essentially a common diameter and which are freely movable radially of the actuating mechanism under influence of centrifugal force generated by rotation of the drive member; and a pair of movable segments, each movable segment being associated with one of the plurality of weights, mounted on the actuating mechanism for circumferential movement, and spring-biased against one direction of circumferential movement; and a connecting ring positioned between and connecting the pair of movable segments and the annular plate.

2. The RPM-responsive sprag overrunning clutch, as defined in claim 1, in which the connecting ring is provided with a pair of knobs protruding in one direction and at least one lug protruding in the opposite direction.

3. The RPM-responsive sprag overrunning clutch, as defined in claim 2, in which each knob of the pair of knobs is engaged with one of the pair of movable segments and the at least one lug is engaged with the annular plate such that circumferential movement of the pair of movable segments is transmitted to the annular plate to shift the plurality of sprags into or out of wedging engagement between the drive member and the driven member.

4. The RPM-responsive sprag overrunning clutch, as defined in claim 3, in which the mass of each weight is calculated to correspond to a given RPM of the driven member so that the plurality of weights will bear against and shift the pair of movable segments at the given RPM, thereby initiating wedging engagement of the plurality of sprags between the drive member and the driven member.

5. A continuously variable transmission, comprising:

an input shaft;

an output shaft;

an intermediate shaft; and a plurality of RPM-responsive overrunning clutches as defined in claim 1 mounted on the input shaft along with a gear, one of the plurality of RPM-responsive clutches being meshed with a gear on the intermediate shaft, each of the remaining RPM-responsive clutches being meshed with a respective overrunning clutch and the gear on the input shaft.

6. The continuously variable transmission, as defined in claim 5, in which actuating mechanisms of each of the plurality of RPM-responsive clutches being constructed to effect wedging engagement of their respective sprags at different RPM of their respective driven members.

7. An RPM-responsive sprag overrunning clutch which includes a sprag assembly, a connecting ring adjacent to the sprag assembly, an actuating mechanism adjacent to the connecting ring, and a sealing cap adjacent to the actuating mechanism and opposite the connecting ring for securing the sprag assembly, the connecting ring, and the actuating mechanism in place relative to a cylindrical hub adapted to be secured to a drive shaft and a ring gear telescoped over the hub and spaced therefrom, a plurality of sprags of the sprag assembly, through which springs biased against wedging engagement extend are secured in place relative to an annular plate of the sprag assembly, with each sprag being pinned to the annular plate, the actuating mechanism including movable segments, arcuate segments fixed in position relative to the sealing cap, and a weight responsive to RPM and positioned circumferentially between the arcuate segments and the movable segments.

8. The RPM-responsive sprag overrunning clutch, as defined in claim 7, in which the weight is free to move radially between the movable segments and the arcuate segments in response to centrifugal force generated from rotation of the hub.

9. The RPM-responsive sprag overrunning clutch as defined in claim 8 in which the actuating mechanism includes at least one fixed segment and at least one movable segment mounted for circumferential movement within the actuating mechanism, the at least one movable segment being connected to the annular plate.

10. The RPM-responsive sprag overrunning clutch as defined in claim 9 in which a mass of a roller is preselected to shift the at least one movable segment away from the at least one fixed segment at a given RPM of the clutch, whereby movement of the at least one movable segment is transferred to the annular plate to move the plurality of sprags into wedging relation with the hub and the ring gear at the given RPM of the clutch thereby effecting driving relation between the hub and the ring gear.

* * * * *